Figure 1:
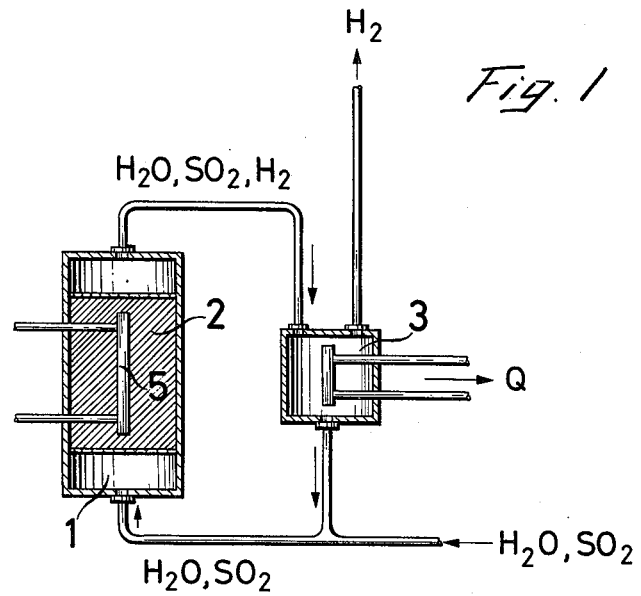

United States Patent
Barnert et al.

[11] 3,995,012
[45] Nov. 30, 1976

[54] PROCESS OF PRODUCING HYDROGEN AND OXYGEN FROM H₂O IN A THERMOCHEMICAL CYCLE

[75] Inventors: Heiko Barnert, Julich; Rudolf Schulten, Richterich, both of Germany

[73] Assignee: Kernforschungsanlage Julich Gesellschaft mit beschrankter Haftung, Julich, Germany

[22] Filed: Dec. 30, 1974

[21] Appl. No.: 537,386

[30] Foreign Application Priority Data
Dec. 29, 1973   Germany............................ 2365120

[52] U.S. Cl. ............................ 423/579; 423/541 R; 423/544; 423/592; 423/558; 423/622; 423/657; 423/658
[51] Int. Cl.² ..................... C01B 13/00; C01B 1/02; C01B 1/05; C01B 1/08
[58] Field of Search ........... 423/644, 648, 544, 657, 423/658, 542, 579, 558

[56] References Cited
UNITED STATES PATENTS

| | | | |
|---|---|---|---|
| 1,969,567 | 8/1934 | Lee .............................. | 423/542 UX |
| 2,927,001 | 3/1960 | McCullough .................... | 423/542 X |
| 3,053,626 | 9/1962 | Patterson ........................ | 423/542 |
| 3,802,993 | 4/1974 | von Fredersdorff ............ | 423/658 X |
| 3,839,550 | 10/1974 | Wentorf, Jr. .................... | 423/644 X |

FOREIGN PATENTS OR APPLICATIONS
171,149   11/1921   United Kingdom................ 423/544

OTHER PUBLICATIONS
C & EN Sept. 3, 1973, pp. 32 & 33.

*Primary Examiner*—Edward Stern
*Attorney, Agent, or Firm*—Walter Becker

[57] ABSTRACT

A method of producing hydrogen and oxygen by splitting water in a thermochemical cycle, according to which in a first method stage a gas mixture of from 1 to 50 parts by volume of steam and 2 parts by volume of sulfur dioxide is reacted at a temperature within the temperature range of from 200° to 400° C with an oxide of one of the metals manganese, iron, cobalt, nickel, zinc or cadmium for forming a metal sulfate and for freeing hydrogen gas. Thereupon the hydrogen gas is in a manner known per se separated from the residual gas mixture and in a second method stage after conversion of the metal oxide to a metal sulfate, the metal sulfate for purposes of decomposition or disintegration and for forming a metal oxide, sulfur dioxide gas and oxygen gas, is heated to a temperature within the temperature range of from 700° to 1000° C. Thereupon the oxygen gas is separated from the sulfur dioxide gas in a manner known per se.

16 Claims, 2 Drawing Figures $2H_2O + 3SO_2 + Co_3O_4 \rightarrow 3CoSO_4 + 2H_2$ (250°C)     $3CoSO_4 \rightarrow Co_3O_4 + 3SO_2 + O_2$ (900°C)

$2H_2O \rightarrow 2H_2 + O_2$ $$2H_2O + 3SO_2 + Co_3O_4 \rightarrow 3CoSO_4 + 2H_2 \quad (250°C)$$

$$2H_2O \rightarrow 2H_2 + O_2$$

$$3CoSO_4 \rightarrow Co_3O_4 + 3SO_2 + O_2 \quad (900°C)$$

PROCESS OF PRODUCING HYDROGEN AND OXYGEN FROM H₂O IN A THERMOCHEMICAL CYCLE

The present invention relates to a method of producing hydrogen and oxygen by splitting water in a thermochemical cycle. Hydrogen is frequently employed as energy carrier and as chemical base substance for instance as raw material in connection with the manufacture of synthetic materials and also in connection with the direct reduction of iron ore. Hydrogen is of particular importance as energy carrier because the transport of energy in a form bound to matter is considerably cheaper than the transport of energy in the form of electricity. Therefore, it is the tendency to transform cheap energies as for instance the heat generated in a core reactor, especially a high temperature reactor, by generating hydrogen in the energy form bound to matter.

Methods for producing hydrogen are known. Thus it has been suggested to generate hydrogen by gasifying fossil energy carriers such as crude oil or coal. While in this instance the cheap heat generated in a core reactor can be employed, it is, however, to be noted that with these known methods the generated hydrogen is obtained to a major portion from the expensive energy carriers so that the cheap energy obtained from the core energy is only to a minor part contained in the thus obtained hydrogen.

Therefore, also methods have been suggested according to which the heat generated in a core reactor is without the employment of other energy sources converted into the energy form of hydrogen. Such method consists for instance in the generation of hydrogen by electrolysis of water in which instance the electric energy produced by a core reactor is employed. Since, however, in this instance the energy obtained by core splitting is transformed several times into another form of energy, it will be obvious that with this known method, the exploitation of the energy obtained by core splitting is not very high so that the method for generating hydrogen on a large scale is not economical.

It has also been suggested to directly convert heat energy and thereby also the energy generated in a core reactor by the generation of hydrogen from water in a thermochemical cycle and without additional sources of energy. Thermochemical cycles for producing hydrogen and the oxygen obtained in connection therewith are well known. These heretofore known methods, however, have the drawback that the first method step in which $CaBr_2$ is brought into reaction with water takes place only with a low yield and that at the same time during the third method step $HgBr_2$ reacts only slowly with $Ca(OH)_2$ in aqueous solution. Therefore, if it is desired with these known methods to obtain a sufficiently high yield, a large reaction container is necessary which, of course, requires high capital investments. This investment is further increased by the fact that the hydrogen bromide employed in the described method is highly corrosive and therefore corrosion resistant and closing materials have to be employed when building the reaction container. In addition thereto the mercury metal employed is highly poisonous which fact requires an additional expense for the separation of the hydrogen and oxygen. It may furthermore be mentioned that mercuric salts and hydrogen bromide have heretofore only to a minor extent been employed on a great scale so that high development expenses are to be expected.

Furthermore a method has become known according to which during the first method step, water is in reaction with chlorine gas converted to HCl and oxygen. Also which this known method it is very disadvantageous that the reaction which occurs during the second method stage occurs only at a low reaction speed. Since furthermore the reaction of the third method stage at a temperature of 800° C can be carried out only with a small yield, approximately 1%, also this known method requires a large reaction container and thus involves high costs. The chlorine gas recovered during the fourth method stage is furthermore produced at only a low pressure so that the employment of an expensive compressor becomes necessary. Furthermore, chlorine and hydrogen chloride are highly aggressive gases which make necessary special provisions.

According to still another heretofore known method which is described in "Hydrogen Production From Water Using Nuclear Heat, EUR 5059 e (Preprint), 1973, page 13", it is disadvantageous that with the reaction occurring in the first method stage of $FeCl_2$ with water, only a minor yield in hydrogen is obtained, and in the second method step or stage, the $Fe_3O_4$ formed in the first method stage reacts only slowly with chlorine gas and hydrochloric acid because for reasons of equilibrium, relatively low temperatures are necessary. Moreover, with these known methods there exists the drawback that the highly corrosive chlorine gas generated in the third method stage from the $FeCl_3$ formed in the second method stage has only a low partial pressure so that also with this known method a compression becomes necessary.

Also with a heretofore known method, (described in Thermochemical Hydrogen Generation, General Electric Company, Corporate Research and Development, Schenectady, N.Y., USA, R. H. Wentorf, R. E. Hanneman, Report No. 73 CRD 222, July 1973) hydrogen is in the first method stage generated from the reaction of $FeCl_2$ with water and yields only a slight yield, and the reaction of the method stage 2 in which $Fe_3O_4$ in reaction with water is converted to $FeCl_2$ and $FeCl_3$, and the reaction of the method stage 4 in which chlorine gas is reacted with $Hg(OH)_2$, occur only at a low speed because they occur in an aqueous solution. Also with this method, due to the low partial pressure of the chlorine gas formed during the third method stage, a compression is necessary. All heretofore known methods therefore have the drawback that they require more than two method stages. Consequently with all these known methods it is necessary for practicing the respective method, to employ more than one reaction container which, of course, requires considerable and additional costs.

It is, therefore, an object of the present invention to provide a method of generating hydrogen and oxygen from water which will overcome the drawbacks of the heretofore known methods for generating hydrogen, and can be practiced in a single reaction container while making it possible to generate hydrogen in two method steps on a large industrial scale and economically.

These and other objects and advantages of the invention will appear more clearly from the following specification in connection with the accompanying drawing diagrammatically illustrating the first method stage and the second method stage according to the invention.

The problem underlying the present invention has been solved according to the present invention by the fact that in the first method stage a gas mixture of steam of 50 volume parts and two volume parts of sulphur dioxide is reacted with an oxide of one of the metals manganese, iron, cobalt, nickel, zinc or cadmium for purposes of forming a metal sulphate and for freeing hydrogen gas. This reaction is effected at a temperature within the temperature range of from 200° to 400° C. Thereupon hydrogen gas is in a manner known per se separated from the residual gas mixture, and in the second method stage after conversion of the metal oxide to metal sulphate the latter for purposes of disintegration or dissociation and while forming a metal oxide, sulphur dioxide gas and oxygen gas is heated up to a temperature within the temperature range of from 700° to 1,000° C, whereupon the oxygen gas is in a manner known per se separated from the fulphur dioxide gas. Thereupon the sulphur dioxide gas generated likewise in the second method stage is mixed with steam and again brought to a rection whereupon the cycle is closed.

A considerable advantage of this method according to the invention is seen in the fact that it consists only of two method steps which two method steps can be carried out in the same reaction container. Therefore, while employing only two reaction containers of the same type it is possible to generate hydrogen in a continuous manner. In this connection, alternately in one reaction container the gas mixture consisting of steam and sulphur dioxide is reacted with the metal oxide, while at the same time in the other reaction container, the gas generated during the disintegration of the metal sulphate, is withdrawn.

As has been found, for a particularly economical operation of the method according to the invention, it is expedient that a gas mixture formed of 5 parts by volume of steam and 2 parts by volume of sulphur dioxide is brought into reaction with one of the metal oxides. A further considerable advantage of the method according to the invention consists in that the cycle can be carried out with different metals for which purpose different oxides of the metals may be used in the first method step.

If for instance the metal manganese is employed, the oxide which is reacted with the gas mixture in the first method step may be $Mn_2O_3$ or $Mn_3O_4$ or $MnO$. The method according to the invention is thus adjustable in conformity with different requirements of employment. In this connection, as has been found, when employing the metal manganese, the gas mixture is reacted with an oxide of the metal manganese expediently at a temperature within the temperature range of from 300° to 400° C. If, on the other hand, the metals cobalt and cadmium are employed, an oxide of these metals is preferably reacted with the gas mixture at a temperature within the temperature range of from 250° to 350° C. When employing iron, nickel or zinc, on the other hand a reaction of the gas mixture with an oxide of these metals is expediently effected at a temperature within the temperature range of from 200° to 300° C.

Also with the disintegration or the dissociation of the sulphates during the first method step, expediently, depending on the metals employed, different temperatures are set in the reaction container. Thus the sulphate of the metal manganese is for purposes of disintegration heated up to a temperature within the range of from 900° to 1,000° C, whereas the sulphate of the metal cobalt is for purposes of disintegration heated to a temperature within the temperature range of from 800° to 900° C. On the other hand, the sulphate of the metal cadmium is for purposes of disintegration heated to a temperature within the temperature range of from 900° to 1,000° C. In contrast thereto, for purposes of disintregation, expediently the sulphate of the metal zinc is heated to a temperature within the temperature range of from 900° to 1,000° C, while the sulphate of the metal nickel is heated to a temperature within the range of from 800° to 900° C, and the sulphate of the metal iron is heated to a temperature range of from 700° to 800° C.

In connection with the method step for disintegrating the sulphate, it is particularly advantageous to heat the sulphate of the metal for purposes of disintegration to a temperature within the upper portion of the temperature range whereupon after disintegration of the metal sulphate, the metal oxide which has a lower oxygen content than the metal oxide which reacted with the gas mixture is by reaction with oxygen converted to a metal oxide containing the oxygen content of the metal oxide which has reacted with the gas mixture. Inasmuch as the transformation of the oxide into an oxide with a higher oxygen content has inherent thereto a structural transformation, it is brought about at the same time that the obtained oxide during the employment of the first method step of the cycle is converted faster and more completely into the sulphate.

When practicing the method according to the invention, an alternative has proved advantageous according to which the metal oxide is in highly dispersed form reacted with the gas mixture because the metal oxide in this connection has a particularly large surface so that the reaction will occur at a high speed.

A further advantageous modification of the method according to the invention consists in that the metal oxide is in the form of a thin layer deposited on a highly porous fixed carrier material and is reacted with the gas mixture. If in this connection the metal oxide is applied as thin layer to a highly porous carrier material which consists of silicon dioxide or contains silicon dioxide, it will be brought about that the reaction temperature of the sulphate disintegration will be reduced.

Referring now to the drawing showing a flow diagram for an example of the method according to the invention, it will be noted that in the method stage 1 (FIG. 1), cobalt oxide is reacted with a mixture of sulphur dioxide and steam as a result of which cobalt sulphate is formed and hydrogen gas is freed in conformity with the reaction equation $$Co_3O_4 + 3 SO_2 + 2H_2O \rightarrow 3 CoSO_4 + 2 H_2 (250°C)$$

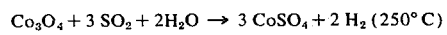

In this connection, a gas mixture consisting of sulphur dioxide and steam is for instance at a pressure of 40 bars passed over the fill 2 of a carrier material in a reaction container 1, upon which carrier material cobalt oxide has been deposited. As a result thereof, the cobalt oxide reacts with the gas mixture and forms cobalt sulphate. The hydrogen generated during this reaction is with the non-use of gas passed over a cooling and separating plant 3 in which the heat $Q_{ab}$ which is generated during the exothermally occurring reaction of the method stage 1 is withdrawn and the hydrogen is separated from the gas mixture. The residual gas mixture is together with the sulphur dioxide recovered in the method stage 2 and together with the fresh steam again fed into the reaction container 1.

Figure 2:
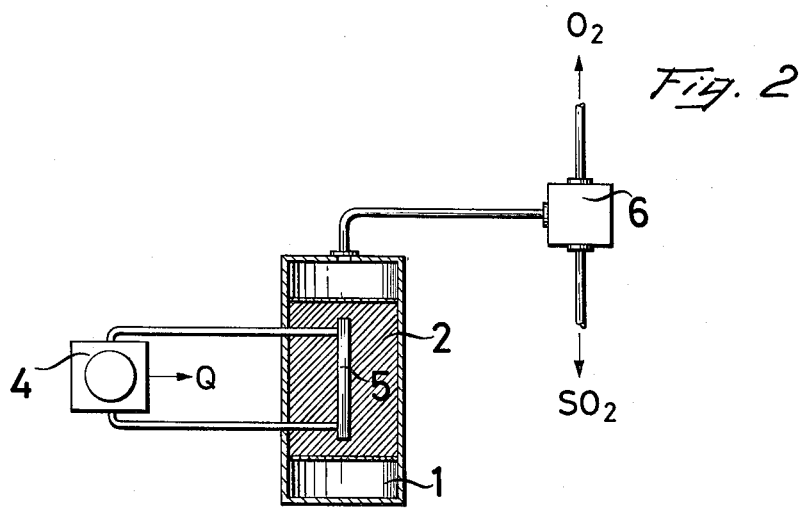

In the method stage 2 (FIG. 2), the cobalt sulphate formed in the method stage 1 is disintegrated or dissociated to sulphur dioxide and oxygen while the conversion is effected in conformity with the equation

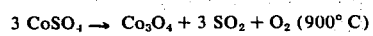
$$3 CoSO_4 \rightarrow Co_3O_4 + 3 SO_2 + O_2 \,(900°\,C)$$

To this end, heat $Q_{zu}$ is conveyed to the reaction vessel 1 from an outer heat source 4, for instance a core reactor, through the heat conveying device 5, and the fill 2 in which the cobalt sulphate is present which was formed in the method stage 1 is kept at a temperature of approximately 900° C. The gas mixture of oxygen gas and sulphur dioxide which was formed during the endothermally occurring reaction of the method stage 2 is after having reached a pressure of approximately 4 bars guided to the separating barrel 6 where oxygen gas and sulphur dioxide gas are separated from each other. The recovered sulphur dioxide gas is again used for the reaction occurring in the method stage 1.

EXAMPLE

Into a high pressure autoclave which is provided with an inner heating system and has an inner volume of 5 liters, there was introduced one gram of a coarse granular mixture of 50% $Co_3O_4$, 10% $SiO_2$ and 40% $Al_2O_3$ which was precipitated from $Al(OH)_3$. The autoclave was closed, rinsed with Argon a plurality of times and subsequently 3 mol parts of sulphur dioxide in liquid form and 2 mol parts water were through pipe connections fed into the autoclave in such a quantity that after heating the inner space of the autoclave to a temperature of 250° C — which temperature was reached after approximately 2 hours — and the inherent evaporation of the two components, a total pressure of 45 bars was obtained. The temperature of 250° C was maintained for approximately 10 minutes. Subsequently, the autoclave was quickly cooled to room temperature. For purposes of a gas chromatic check, a portion of the gas in the autoclave was pumped out, and in the pumped out gas, hydrogen was ascertained gas chromatographically in an amount of 300 VPM. From the coarse granular mixture, a sample was withdrawn and was chemically analyzed cobalt oxide and cobalt sulphate components. The analysis indicated that of the cobalt oxide which was present prior to the reaction, approximately 26% had been transformed to cobalt sulphate. This method step was for purposes of obtaining a greater quantity of cobalt sulphate (intended for the second method step) with fresh coarse granular mixture repeated several times with the same result. Subsequently thereto, 10 grams of the coarse granular mixture of $Co_3O_4$, $CoSO_4$, $SiO_2$, and $Al_2O_3$ which had been subjected to the first method step were introduced into a high temperature reaction vessel with an inner volume of 0.5 liters, and the vessel was after a repeated rinsing evacuated with Argon. In this connection it may be mentioned that the coarse granular mixture employed for the second method step corresponding to the sample obtained after the first method step, which means that 26% of the cobalt oxide was transformed into cobalt sulphate, the proportion of $SiO_2$ and $Al_2O_3$ was the same. Subsequently, the vessel was within approximately half an hour heated up to 900° C while in the vessel a total pressure of approximately 4 bars was obtained. Thereupon the vessel was again cooled to room temperature. The gas in the reaction vessel was then pumped off and in the pumped-off gas a proportion of approximately 25% of oxygen gas was chromatographically obtained. A chemical analysis of the coarse granular mixture as to $Co_3O_4$, $CoSO_4$, and the admixed carrier material indicated that 60% of the $CoSO_4$ was in the second method stage converted again to cobalt oxide.

It is, of course, to be understood that the present invention is, by no means, limited to the specific showing in the drawing nor to the specific example set forth above but also comprises any modifications within the scope of the appended claims.

What we claim is:

1. A method of producing hydrogen and oxygen from water in a thermochemical cycle, which includes in combination the steps of: in a first method stage reacting a gas mixture of from 1 to 50 parts by volume of steam and 2 parts by volume of sulfur dioxide at a temperature within the temperature range of from 200° to 400° C with an oxide respectively of one of the metals selected from the group consisting of manganese, iron, cobalt, nickel, zinc, and cadmium for forming a metal sulfate and for freeing hydrogen, separating hydrogen from the residual gas mixture, in a second method stage after conversion of the metal oxide to a metal sulfate heating said metal sulfate for purposes of decomposition and for forming a metal oxide and sulfur dioxide gas and oxygen gas to a temperature within the temperature range of from 700° to 1000° C, subsequently separating said oxygen gas from said sulfur dioxide gas and returning said sulfur dioxide to said first stage for reaction with steam and the metal oxide.

2. A method in combination according to claim 1, in which said gas mixture contains 5 parts by volume of steam and 2 parts by volume of sulfur dioxide.

3. A method in combination according to claim 1, in which said gas mixture is reacted with an oxide of manganese at a temperature within the temperature range of from 300° to 400° C.

4. A method in combination according to claim 1, in which said gas mixture is reacted with an oxide of a metal selected from the group consisting of cobalt and cadmium at a temperature within the temperature range of from 250° to 350° C.

5. A method in combination according to claim 1, in which said gas mixture is reacted with an oxide of a metal selected from the group consisting of iron, nickel, and zinc at a temperature within the temperature range of from 200° to 300° C.

6. A method in combination according to claim 1, which includes the steps of: reacting said gas mixture with an oxide of manganese, transforming the thus obtained product to manganese sulfate, and subsequently heating said manganese sulfate at a temperature within the temperature range of from 900° to 1000° C for purposes of decomposing said manganese sulfate.

7. A method in combination according to claim 1, which includes the steps of: reacting said gas mixture with an oxide of cobalt, transforming the thus obtained product to cobalt sulfate, and subsequently heating said cobalt sulfate at a temperature within the temperature range of from 800° to 900° C for purposes of decomposing said cobalt sulfate.

8. A method in combination according to claim 1, which includes the steps of: reacting said gas mixture with an oxide of cadmium, transforming the thus obtained product to cadmium sulfate, and subsequently heating said cadmium sulfate at a temperature within the temperature range of from 900° to 1000° C for purpose of decomposing said cadmium sulfate.

9. A method in combination according to claim 1, which includes the steps of: reacting said gas mixture with an oxide of zinc, transforming the thus obtained product to zinc sulfate, and subsequently heating said zinc sulfate at a temperature within the temperature range of from 900° to 1000° for purposes of decomposing said zinc sulfate.

10. A method in combination according to claim 1, which includes the steps of: reacting said gas mixture with an oxide of nickel, transforming the thus obtained product to nickel sulfate, and subsequently heating said nickel sulfate at a temperature within the temperature range of from 800° to 900° C for purposes of decomposing said nickel sulfate.

11. A method in combination according to claim 1, which includes the steps of: reacting said gas mixture with an oxide of iron, transforming the thus obtained product to iron sulfate, and subsequently heating said iron sulfate at a temperature within the temperature range of from 700° to 800° C for purposes of decomposing said iron sulfate.

12. A method in combination according to claim 1, in which for purposes of decomposing said metal sulfate is heated to a temperature in the upper range of said temperature range in said second method stage whereupon subsequently to the decomposition of said metal sulfate the metal oxide formed by said decomposition and having a lower oxygen content than the metal oxide reacted with said gas mixture is reacted with oxygen so as to convert the metal oxide obtained by said last mentioned decomposition to a metal oxide having substantially the same oxygen content as the metal oxide which reacted with said gas mixture.

13. A method in combination according to claim 1, in which said metal oxide is brought into reaction with said gas mixture in a highly dispersed form.

14. A method in combination according to claim 1, in which said metal oxide is applied as a thin layer onto a highly porous fixed carrier material and in this form is reacted with said gas mixture.

15. A method in combination according to claim 14, in which said carrier material is silicon dioxide.

16. A method in combination according to claim 14, in which said carrier material is a material containing silicon dioxide.

* * * * *